(12) United States Patent
Dippon et al.

(10) Patent No.: US 8,572,143 B2
(45) Date of Patent: Oct. 29, 2013

(54) WAVEFORM GENERATOR WITH A REGISTER THAT SHIFTS AND PROVIDES GROUPS OF SUCCESSIVE DATA VALUES FROM AN INPUT DATA STREAM

(75) Inventors: Thomas Dippon, Boeblingen (DE); Clemens Rabenstein, Boeblingen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 1002 days.

(21) Appl. No.: 12/614,872

(22) Filed: Nov. 9, 2009

(65) Prior Publication Data
US 2011/0109349 A1    May 12, 2011

(51) Int. Cl.
*H03B 21/00* (2006.01)

(52) U.S. Cl.
USPC ............. 708/270; 708/271; 702/67; 702/118; 327/106; 327/105

(58) Field of Classification Search
USPC .............................. 708/270, 271; 702/67, 118
See application file for complete search history.

(56) References Cited

U.S. PATENT DOCUMENTS

| | | | |
|---|---|---|---|
| 6,768,349 B2 * | 7/2004 | Nakagawa | 327/100 |
| 7,024,322 B2 * | 4/2006 | Kolman et al. | 702/67 |
| 7,783,439 B2 * | 8/2010 | Kossel et al. | 702/67 |
| 8,224,613 B2 * | 7/2012 | Calvin et al. | 702/118 |

* cited by examiner

*Primary Examiner* — Tammara Peyton

(57) ABSTRACT

An output signal is generated from a received input data stream representing a sequence of digital data values. For each group of successive data values in the sequence of data values, a respective waveform pattern is assigned in dependence of the data content of the respective group of successive data values. The output signal is generated by generating the assigned respective waveform patterns corresponding to the input data stream.

19 Claims, 1 Drawing Sheet

WAVEFORM GENERATOR WITH A REGISTER THAT SHIFTS AND PROVIDES GROUPS OF SUCCESSIVE DATA VALUES FROM AN INPUT DATA STREAM

BACKGROUND ART

The present invention relates to generating waveform signals.

Test signals for testing digital devices are usually generated by a pulse/data generator or an arbitrary waveform generator (AWG). Pulse/data generators, such as the Agilent Technologies 81130A Pulse Data Generator, allow generating pulses at controlled repetition rate, pulse width, delay and with controllable rise and fall times of the pulses or digital data patterns with adjustable levels, but without bit shape distortions. Arbitrary waveform generators, such as the Agilent Technologies N8241A Arbitrary Waveform Generator Synthetic Instrument Module allow generating signals at any arbitrarily selectable waveform to be programmed.

DISCLOSURE

It is an object of the invention to provide an improved generating of waveform signals, in particular allowing to generate long data patterns. The object is solved by the independent claim(s). Further embodiments are shown by the dependent claim(s).

According to an embodiment of the present invention, an output signal is generated from a received input data stream representing a sequence of digital data values. For each group of successive data values in the sequence of data values, a respective waveform pattern is assigned in dependence of the data content of the respective group of successive data values. The output signal is generated by generating the assigned respective waveform patterns corresponding to the input data stream. This allows generating the output signal based on and corresponding to any arbitrary input data stream, which is neither limited in length nor in content.

The input data stream can be, for example, a stored digital data sequence, a signal generated by an algorithm, a pseudo-random binary sequence (PRBS), a signal received from an external source, or any other adequate source. Thus, a broad range of input data stream can be applied and used as source for generating the output signal.

Each digital value may represent a respective logical state. Each logical state may represent a respective logical state in or during a cycle of a clock signal or otherwise related to a respective cycle of the clock signal. In one embodiment, each digital data value represents one logical state out of two or more logical states, e.g. a two level signal with a HIGH and a LOW state, a two level signal with a HIGH and a LOW state and optionally an IDLE state, or a three levels signal with three different signal levels.

In one embodiment, the group of successive data values comprises two or more successive data values, preferably a pair of successive data values.

The groups may be selected to be overlapping or non-overlapping. In the former case, except of the first group of successive data values, each group of successive data values comprises at least one data value which is also part of or present in the respective previous group of successive data values, so that two successive groups always have at least one data value in common. In the latter case of non-overlapping groups, each group of successive data values only comprises data values not being in the respective previous or successive group of successive digital data values, so that each group contains exclusive data values which are not part of any other group.

In one embodiment, the data content of the respective group of successive data values represents the sequences in time of the successive digital data values, e.g. the sequence in time of transitions between the successive digital data values. For example, a two level signal, wherein during the first two clock cycles the level is LOW, then changes in the next clock cycle to HIGH, changes back for two clock cycles to LOW, and then stays for two clock cycles at HIGH shall have the data content of "0010011" (with "0" representing LOW, and "1" representing HIGH).

In one embodiment, the received input data stream is analyzed for determining the sequence of digital data values. Such analyzing might comprise sampling and quantizing the input data stream at defined threshold values and/or defined timing position relative to the clock signal. The received input data stream may be analyzed automatically, for example upon receipt and/or in real-time with or without delay. Accordingly, almost any kind of arbitrary source can be used as the input data stream and is automatically processed resulting in the output signal.

In one embodiment, assigning the respective waveform pattern comprises selecting a respective one of a given set of waveform pattern in dependence of the data content of the respective group of successive data values. In such embodiment, a set of waveform patterns is given and might be stored e.g. in a memory, and a respective waveform is then selected from such set of waveform patterns corresponding to the data content of the respective group of successive data values. In an example of a two level signal, there might be four different waveform patterns stored: a waveform pattern A representing a state as long as the input data stream is or stays on LOW, a waveform pattern B representing a state as long as the input data stream is or stays on HIGH, a waveform pattern C representing a transition from LOW to HIGH, and a waveform pattern D representing a transition from HIGH to LOW. For the example of an input data stream of 0010011, this would result in waveform pattern A for the first group of successive data values "00", waveform pattern C for the transition "01" in the next group of successive data values, waveform pattern D for the transition "10" in the next group of successive data values, waveform pattern A again for "00" in the next group of successive data values, waveform pattern C again for the transition "01" in the following group of successive data values, and waveform pattern B for "11" in the last group of successive data values. In this example, each group comprises a pair of two successive data values, and the groups are selected to be overlapping. Accordingly, except of the first group of successive data values, each group of successive data values comprises one data value which is also part of the respective previous group of successive data values, so that the first data value of each group (except the first group) is the second data value of the respective previous group.

In one embodiment, assigning the respective waveform pattern comprises applying as set of rules for determining the respective waveform pattern in dependence of the data content of the respective group of successive data values. Such rule might be or comprise a rule identifying transitions between logical states, a rule assessing whether an identified transition is a valid transition between different logical states, a rule considering the data content occurring in the input data stream before the respective group of successive data value, etc. By using such rules, the influence of the foregoing "history" of the input data stream can be considered as well as valid transitions verified or non-valid transitions rejected. For example, in case of a longer period wherein the input data stream remains at a certain level, the shape of the following transition (which may differ from other transitions due to such history) can be selected to represent such history. In another example of a two level signal, for example a transition from HIGH to LOW succeeding a LOW level can be identified as a non-valid transition contradicting the data content of the input data stream. Many transmission systems exhibit a variation in transmission in dependence of the history of the data stream. As an example for such "history dependency", many transmission systems show a different behavior of a transition from one level to another level whether there has been a continuous transitioning between the levels or whether there has been a longer period before the transition wherein only a certain level has been maintained. Adequate counteractions might be triggered upon detection of a non-valid transition, such as outputting a default value or waveform pattern, initiating and/or executing correction, stopping the waveform generation, etc.

In one embodiment, each waveform pattern comprises a sequence of amplitude level values, e.g. a sequential order of signal or voltage levels, which may then be output by a digital to analog converter. Each waveform pattern may represent a shape of waveform, for example, a transition between different logical states, a shape of a signal remaining substantially at the same level, etc.

The waveform patterns may be preferably designed so that successive groups of successive data values result in a substantially continuous waveform shape or that the output signal results in a substantially continuous waveform shape. This can be done, for example, by designing the waveform patterns so that successive patterns fit neatly together, e.g. differences in amplitude or level are within certain limitations. As an example, waveform patterns are designed so that the start and end of each pattern matches with the corresponding end and start of a previous or successive pattern. However, it is clear that only meaningful sequences, which represent a possible sequence of digital data values, have to be considered to be matching.

In one embodiment, the waveform patterns are stored in a data memory. The output signal can be generated by reading out the respective waveform patterns from the data memory and generating therefrom a stream of analog waveform signals corresponding to the input data stream. Corresponding in this context shall mean that the data content and sequential order of the output stream substantially corresponds to the data content and sequential order of the input data stream. In other words, the output stream may be regarded as corresponding to the input data stream, if the data content of the digitized output stream substantially matches the data content of the input data stream. It is clear that dependent on the way of analog to digital conversion applied in the digitizing of the input stream the data content may differ from the input data stream. For example a different sampling threshold or level can lead to a different digitized value.

After reading out the stored waveform pattern information from the data memory, the readout information may then be clocked to a digital to analog converter (DAC) and may then be filtered for smoothing the output signal.

In one embodiment, each waveform pattern can be arbitrarily defined in at least one of shape and resolution, for example, by a user. This allows that the output signal can be designed by the user in accordance to the respective requirement.

In one embodiment, the output signal is generated as a stream of analog waveform signals corresponding to the input data stream, which might comprise the data content of the input data stream and/or transitions between logical states of the input data stream. Thus, the output signal is generated by joining the analog waveform signal pattern one after the other. In case of the aforementioned example of a two level input data stream and by using four different waveform patterns, the output signal will be a succession of the analog waveform signals corresponding to each respective waveform pattern joined one after the other corresponding to the data content of the input data stream.

In one embodiment, the output signal is generated by generating a sequence of analog waveform signals from the waveform patterns, so that the sequence of analog waveform signals corresponds to the input data stream.

In one embodiment, the output signal is modulated in order to emulate a desired waveform of the output signal. In case of a DAC employed for converting the stored pattern information to an analog waveform, such modulating might be provided either before or after the DAC. The modulating may be provided by applying a modulating scheme as known in the art, such as direct digital synthesis (DDS), amplitude modulation (AM), frequency modulation (FM), phase modulation (PM), a variation of the clock cycle time, or any other modulation scheme as known in the art. Applying such modulation provides a further degree of freedom in the design of the output signal in order to derive a desired waveform of the output signal, for example, in order to emulate a real world signal as a signal deviating from an ideal shape and being subject to influences from various sources or to emulate a signal containing jitter. Such real world signals are useful in many applications in order to test devices receiving such signals.

Embodiments of the present invention can be executed as methods, software, or in a waveform generator. The aforementioned applies accordingly for all embodiments.

Embodiments of the invention can be partly or entirely embodied or supported by one or more suitable software programs, which can be stored on or otherwise provided by any kind of data carrier or memory, and which might be executed in or by any suitable data processing unit or controller.

BRIEF DESCRIPTION OF DRAWINGS

Other objects and many of the attendant advantages of embodiments of the present invention will be readily appreciated and become better understood by reference to the following more detailed description of embodiments in connection with the accompanied drawing(s). Features that are substantially or functionally equal or similar will be referred to by the same reference sign(s).

FIG. 1 shows an embodiment of a waveform generator 10 according to the present invention. An input data stream 20 is coupled to a first register 30, which might be a FIFO (first in first out) register. A second register 40, which might be a shift register, reads out the output from the first register 30. A clock enable 45 for the FIFO 30 read and the shift register 40 can be an overflow signal from a phase accumulator 50 having an increment 60. A parallel output 55 of the shift register 40 and the most significant bits 57 from the phase accumulator 50 are used to address a bit shape memory 70, which contains stored waveform patterns, as will be explained in detail later. The bit shape memory 70 is connected to a digital to analog converter (DAC) 80, which converts the digital output from the bit shape memory 70 to an analog output signal 90.

Figure 1:
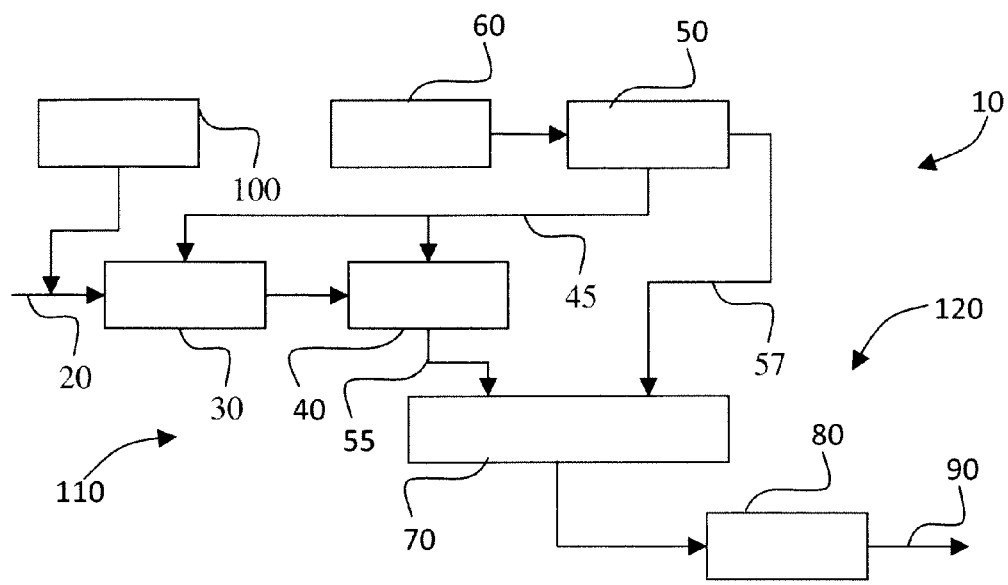
FIG. 1 shows an embodiment of a waveform generator 10 according to the present invention.

The input data stream 20 can be a stored digital data sequence, for example stored in a memory 100 as indicated in FIG. 1. The input data stream 20 might also be a signal generated by an algorithm such as a PRBS (e.g. PRBS 31). As a further alternative, the input data stream 20 might also be received from an external source (not shown in FIG. 1).

In FIG. 1, the first and second registers 30 and 40 together with the bit shape memory 70 represent a controller 110 for receiving the input data stream 20 representing a sequence of digital data values and for assigning—for each group of successive data values in the sequence of data values—a respective waveform pattern (stored in the bit shape memory 70) in dependence of the data content of the respective group of successive data values in the input data stream 20. The DAC 80 then represents a signal generator 120 for generating the output signal 90 by generating the assigned respective waveform patterns (as stored and received from the bit shape memory 70) corresponding to the input data stream 20.

It is clear for the person skilled in the art that many alternatives exist for the embodiment of FIG. 1 without departing from the teaching of the present invention. Any other suitable circuit known in the digital signal processing can be applied accordingly.

Figure 2:
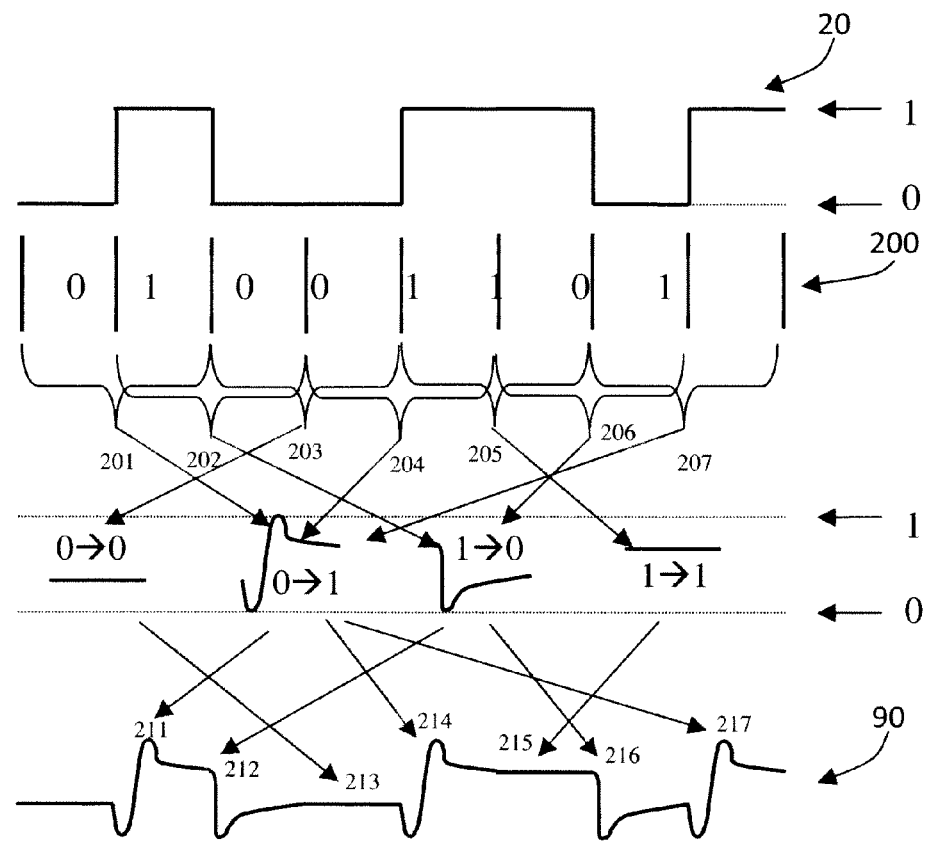
FIG. 2 illustrates schematically in an example how to derive the output signal 90 from the input data stream 20.

FIG. 2 illustrates schematically in an example how to derive the output signal 90 from the input data stream 20. In this embodiment, the input data stream 20 shall be a two level signal having two defined states LOW ("0") and HIGH ("1"). Line 200 indicates the sequence of digital data values representing the input data stream 20. Each digital data value represents the respective logical state (i.e. "0" or "1") during a corresponding cycle of a clock signal as indicated by the vertical lines. In this example, the input data stream 20 represents the sequence of digital data values "01001101".

Turning back to FIG. 1, the sequence of digital data values 20 is fed into the first register 30, which sequentially shifts (with each clock cycle) each input digital data value through the first register 30 and provides an output to the second register 40 in a FIFO mode. In this example, the second register 40 has two register entries and clocks the output of the FIFO 30 through. With the above example of the sequence of digital data values "01001101", at the first clock signal the first entry the second register 40 receives and contains the first output "0" from the FIFO 30. At the second clock signal the first entry receives and contains the second output "1" from the FIFO 30, while the second entry of the second register 40 receives and contains the content "0" of the first entry of the first clock cycle. At the third clock signal the first entry receives and contains the third output "0" from the FIFO 30, and the second entry of the second register 40 receives and contains the content "1" of the first entry of the second clock cycle, etc.

Accordingly, at the first clock signal, the second register 40 contains "0 X" as a first group of successive data values with "X" being a former entry. At the second clock signal, the second register 40 contains "10" as a second group of successive data values and assigns a respective waveform pattern stored in the bit shape memory 70, as will be explained later, by addressing the bit shape memory 70. At the third clock signal, the second register 40 contains "01" as a third group of successive data values and assigns a respective waveform pattern by addressing the bit shape memory 70, etc.

Turning back to FIG. 2, the first two (from the left) digital values "01" represent the second group of successive data values (which however is contained in opposite direction in the second register 40 as "10"). In FIG. 2, the second group is indicated by bracket 201. According to the content "01" of this second group 201, the shift register 40 addresses the bit shape memory 70 to output a respective waveform pattern "0→1" as indicated in FIG. 2. The bit shape memory 70 outputs a corresponding digital information, representing the assigned waveform pattern, to the DAC 80 which generates an analog output signal (arrow 211) corresponding to the selected waveform pattern "0→1". This is indicated in FIG. 2 by the respective arrow 201 showing from the second group 201 ("01") to the waveform pattern "0→1" and then to a section 211 in the output signal 90.

In a next cycle, the first register 30 clocks the next digital data value "0" into the shift register 40, which then contains the "1" from the first group and the "0" as just provided from the first register 30. The "10" (which however is contained in opposite direction in the second register 40 as "01") provides the third group 202 of successive data values, as indicated by the second bracket from the left underneath line 200. According to the data content "10" the shift register 40 addresses the bit shape memory 70 to output corresponding digital information representing the waveform pattern "1→0" as shown in FIG. 2. As in the foregoing, the DAC 80 then generates the next waveform section 212 which is appended to the former waveform section in the output signal 90.

The next group of successive data values as clocked into the shift register 40 is then "00", as indicated by the third bracket 203 from the left. In accordance with the aforesaid, a waveform pattern "0→0" is selected, addressed to the bit shape memory 70, and a corresponding analog waveform section 213 is output by the DAC 80 into the output signal 90.

Correspondingly, the next group 204 of successive data values ("01") results in analog waveform section 214, group 205 ("11") results in analog waveform section 215, group 206 ("10") results in analog waveform section 216, and group 207 ("01") results in analog waveform section 217, which are processed in accordance with the aforesaid thus resulting in the (total) output signal 90 in FIG. 2.

By comparing the input data stream 20 with the output signal 90 in FIG. 2, it becomes apparent that the sequence of digital data values of the input data stream 20 is maintained in the output signal 90 or, in other words, that both signals contain the same data content. However, while the input data stream 20 represents the "ideal" digital signal, the output signal 90 shows a "real world" signal having a waveform representing a signal being subject to losses e.g. during transmission. Such real world signal can then be used for testing a digital circuit, for example, in order to simulate actual signals received after transmission.

From the foregoing it becomes apparent that any kind of input data stream 20 can be used for automatically generating the output signal 90. For example, a PRBS might be used as input data stream 20. It is clear that the input data stream 20 is not limited in length or content. This allows overcoming a general limitation in AWGs, which are usually limited in the length of the data stream and requiring programming of the entire desired output signal.

In order to further modify the shape of the output signal 90, the data rate of the output signal can be modulated by modulating the increment 60 of the phase accumulator 50. In this way, a direct digital synthesis (DDS) can be provided, so that only a reduced number of data points of the stored waveform pattern is provided to DAC 80, for example, only every second, third, etc. data point, thus reducing the resolution of the output analog data sequence but increasing the frequency of the output. For example, by increasing the increment from one to two, the DAC 80 will receive only each second data point of each waveform pattern, thus doubling the output frequency without increasing the sample rate of the DAC 80.

Other modulation schemes can be applied accordingly, such as amplitude modulation for varying the amplitude of the DAC 80, frequency modulation for varying the output frequency of the DAC 80 or phase modulation for varying the phase of the output signal of the DAC 80.

For the above example of a two level signal, four different waveform patterns are sufficient in case each group of successive data values contains two data values. In case the group is enlarged, for example, to three or four data values per group, a greater number of different waveform patterns can be used and allows to more accurately mapping the course of the digital data values into a real world signal. In particular as many transmission systems exhibit a variation in transmission in dependence of the history of the data stream, such "real world behavior" might be more accurately mapped in the output signal 90. As an example for such "history dependency", many transmission systems show a different behavior of a transition from one level to another level whether there has been a continuous transitioning between the levels or whether there has been a longer period before the transition wherein only a certain level has been maintained.

While the invention has been described for a two level signal, it goes without saying that the invention can also be applied for any plural level signals system, such as a three level signal or four level signal system. In case of a three level signal, nine ($=3^2$) different waveform patterns can be used in case each group of successive data values contains a pair of data values. Accordingly, for a four level signal, 16 ($=4^2$) different waveform patterns can be applied, and for an n-level-signal, $n^2$ waveform patterns can be used.

In the embodiment of FIG. 2 the assigning of the respective waveform pattern has been shown for overlapping groups of successive data values, i.e. each group contains at least one data value of the preceding group of successive data values. It is clear, however, that the groups can also be selected to be non-overlapping. In this case, information from the previous group should be maintained for processing the current group in order to assign the corresponding waveform pattern.

In a further embodiment, a set of rules is applied for assigning the respective waveform patterns in dependence of the data content of the respective group of successive data values. Such rules can be used for identifying transitions between logical states and might further be used for assessing whether such identified transitions represent valid transitions. Such invalid transitions (e.g. "01" after "11" in the foregoing example) or invalid successions of waveform pattern (for example "00" after "11") can be implemented by using an exclusion table determining whether such sequences or transitions are valid or not.

While FIG. 1 has been described for serial data input, it is clear that the digital data values may also be provided in parallel, as well known in the art, further requiring modifying the digital processing circuitry accordingly.

The invention claimed is:

1. A method of generating an output signal, the method comprising:
receiving an input data stream representing a sequence of digital data values,
employing a register to shift the data values and provide groups of successive data values of the input stream,
for each group of the successive data values in the sequence of data values, assigning a respective waveform pattern in dependence of the data content of the respective group of successive data values, and
generating the output signal by generating the assigned respective waveform patterns corresponding to the input data stream.

2. The method of claim 1, wherein the input data stream is one of a stored digital data sequence, a signal generated by an algorithm, a pseudorandom binary sequence, a signal received from an external source.

3. The method of claim 1, comprising at least one of:
each digital data value represents a respective logical state;
each digital data value represents a respective logical state, wherein each logical state represents a respective logical state in or related to a cycle of a clock signal;
each digital data value represents one logical state out of two or more logical states.

4. The method of claim 1, comprising at least one of:
the group of successive data values is a pair of successive data values;
the group of successive data values comprises two or more successive data values;
except of a first group of successive data values, each group of successive data values comprises at least one data value also being in the respective previous group of successive data values;
each group of successive data values only comprises data values not being in the respective previous or successive group of successive digital data values.

5. The method of claim 1, comprising at least one of:
the data content of the respective group of successive data values represents the sequence in time of the successive digital data values;
the data content of the respective group of successive data values represents the sequence in time of transitions between the successive digital data values.

6. The method of claim 1, comprising:
analyzing the received input data stream for determining the sequence of digital data values.

7. The method of claim 6, comprising at least one of:
the received input data stream is analyzed automatically upon receipt;
the received input data stream is analyzed automatically in real time.

8. The method of claim 1, wherein assigning the respective waveform pattern comprises selecting a respective one of a given set of waveform patterns in dependence of the data content of the respective group of successive data values.

9. The method of claim 1, wherein assigning the respective waveform pattern comprises applying a set of rules for determining the respective waveform pattern in dependence of the data content of the respective group of successive data values.

10. The method of claim 9, wherein the set of rules comprise at least one of: a rule identifying transitions between logical states, a rule assessing whether an identified transition is a valid transition between different logical states, a rule considering the data content before the respective group of successive data values.

11. The method of claim 1, comprising at least one of:
each waveform pattern comprises a sequence of amplitude level values;
each waveform pattern represents a shape of waveform;
the waveform patterns are designed so that successive groups of successive data values result in a continuous waveform shape;
the waveform patterns are designed no that the output signal results in a continuous waveform shape;
the waveform patterns are designed so that a meaningful sequence of waveform patterns results in a continuous waveform shape;

the waveform patterns are designed so that a meaningful sequence of waveform patterns results in a continuous waveform shape, wherein a sequence of waveform patterns is meaningful, if it represents a possible sequence of digital data values.

12. The method of claim 1, comprising at least one of:
the waveform patterns are stored in a data memory;
generating the output signal comprises reading out the respective waveform patterns from a data memory and generating therefrom a stream of analogue waveform signals corresponding to the input data stream;
each waveform pattern is arbitrarily definable in at least one of shape and resolution.

13. The method of claim 1, comprising at least one of:
generating the output signal as a stream of analogue waveform signals corresponding to the input data stream;
generating the output signal as a stream of analogue waveform signals corresponding to the data content of the input digital data stream;
generating the output signal as a stream of analogue waveform signals corresponding to transitions between logical states of the input data stream;
generating the output signal by generating a sequence of analogue waveform signals from the waveform patterns, wherein the sequence of analogue waveform signals corresponds to the input data stream.

14. The method of claim 1, comprising at least one of:
modulating the output signal to emulate a desired waveform of the output signal;
modulating the output signal to emulate a desired waveform of the output signal by amplitude modulation, frequency modulation, phase modulation, varying clock cycle time, offset modulation.

15. The method of claim 1, comprising:
shaping the output signal by applying direct digital synthesis.

16. A software program or product, stored on a memory, for controlling or executing the method of claim 1, when run on a data processing controller.

17. A waveform generator for generating an output signal, comprising:
a controller configured for receiving an input data stream representing a sequence of digital data values, for shifting the data values to provide groups of successive data values of the input data stream, and for assigning for each group of successive data values in the sequence of data values a respective waveform pattern in dependence of the data content of the respective group of successive data values, and
a signal generator configured for generating the output signal by generating the assigned respective waveform patterns corresponding to the input data stream.

18. The method of claim 1, wherein said assigning comprises identifying transitions between logical states of data values for each group of the successive data values of the input stream.

19. The waveform generator of claim 17, wherein said controller is configured to assign the waveform pattern by identifying transitions between logical states of data values for each group of the successive data values of the input stream.

* * * * *

UNITED STATES PATENT AND TRADEMARK OFFICE
CERTIFICATE OF CORRECTION

PATENT NO. : 8,572,143 B2  
APPLICATION NO. : 12/614872  
DATED : October 29, 2013  
INVENTOR(S) : Thomas Dippon et al.

Page 1 of 1

It is certified that error appears in the above-identified patent and that said Letters Patent is hereby corrected as shown below:

In the Claims

In column 8, line 9, In Claim 3, below "one of:" delete "each digital data value represents a respective logical state;".

In column 8, line 63, In Claim 11, delete "no" and insert -- so --, therefor.

Signed and Sealed this  
Twenty-fifth Day of February, 2014

Michelle K. Lee  
*Deputy Director of the United States Patent and Trademark Office*